(12) United States Patent
Kahl et al.

(10) Patent No.: US 10,227,092 B2
(45) Date of Patent: Mar. 12, 2019

(54) FLAP ASSEMBLY FOR A MOTOR VEHICLE

(71) Applicant: Bayerische Motoren Werke Aktiengesellschaft, Munich (DE)

(72) Inventors: Florian Kahl, Unterschleissheim (DE); Thoralf Maier, Germering (DE); Martin Hampel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/401,340

(22) Filed: Jan. 9, 2017

(65) Prior Publication Data

US 2017/0113737 A1 Apr. 27, 2017

Related U.S. Application Data

(63) Continuation of application No. PCT/EP2015/064382, filed on Jun. 25, 2015.

(30) Foreign Application Priority Data

Jul. 10, 2014 (DE) .................... 10 2014 213 460

(51) Int. Cl.
*B62D 25/12* (2006.01)
*B62D 25/08* (2006.01)
(Continued)

(52) U.S. Cl.
CPC .............. *B62D 25/12* (2013.01); *B60K 11/08* (2013.01); *B62D 25/081* (2013.01); *B62D 25/105* (2013.01)

(58) Field of Classification Search
CPC ....... B62D 25/12; B62D 25/081; B60K 11/08
(Continued)

(56) References Cited

U.S. PATENT DOCUMENTS 2,137,323 A * 11/1938 Wallach ................ B60H 1/242
180/90
3,909,058 A 9/1975 Kraemer et al.
(Continued)

FOREIGN PATENT DOCUMENTS

CN 1727245 A 2/2006
CN 104254454 A 12/2014
(Continued)

OTHER PUBLICATIONS

International Search Report (PCT/ISA/210) issued in PCT Application No. PCT/EP2015/064382 dated Sep. 1, 2015 with English translation (eight pages).

(Continued)

*Primary Examiner* — Jason S Morrow
*Assistant Examiner* — E Turner Hicks
(74) *Attorney, Agent, or Firm* — Crowell & Moring LLP

(57) ABSTRACT

A flap assembly for a motor vehicle includes a front flap which closes an assembly space of the motor vehicle and can be pivoted between a closed state and an open state. The front flap has a flap wall which, in the closed state of the front flap, extends substantially in a vehicle vertical direction, and the assembly space has an assembly space wall. The flap wall and the assembly space wall are designed to be located opposite each other in the closed state of the front flap. They form a sealing action in order to prevent entry of contaminants into the assembly space.

20 Claims, 2 Drawing Sheets

(51) Int. Cl.
  *B62D 25/10* (2006.01)
  *B60K 11/08* (2006.01)
(58) Field of Classification Search
  USPC .............................. 296/76, 192, 201, 96.21
  See application file for complete search history.

(56) References Cited

U.S. PATENT DOCUMENTS

| | | | |
|---|---|---|---|
| 4,186,476 A | 2/1980 | Mair et al. | |
| 6,193,305 B1 | 2/2001 | Takahashi | |
| 8,096,611 B2* | 1/2012 | Maruyama | B60D 25/105 |
| | | | 180/69.2 |
| 2005/0179285 A1* | 8/2005 | Nakajima | B62D 25/081 |
| | | | 296/192 |
| 2009/0058139 A1 | 3/2009 | Izawa | |
| 2013/0113236 A1* | 5/2013 | Oomen | B60J 10/84 |
| | | | 296/192 |
| 2014/0265446 A1* | 9/2014 | Ellison | B62D 25/081 |
| | | | 296/192 |
| 2015/0013372 A1 | 1/2015 | Harke | |
| 2015/0151606 A1 | 6/2015 | Harke | |
| 2016/0229459 A1* | 8/2016 | Ishihara | B62D 25/081 |
| 2016/0347375 A1* | 12/2016 | Kaba | B62D 25/081 |

FOREIGN PATENT DOCUMENTS

| | | |
|---|---|---|
| DE | 43 41 343 A1 | 7/1994 |
| DE | 103 16 519 A1 | 11/2004 |
| EP | 2 660 084 A1 | 11/2013 |
| FR | 2 733 723 A1 | 11/1996 |
| FR | 2 935 336 A3 | 3/2010 |
| GB | 732875 A | 6/1955 |
| JP | 57-104470 A | 6/1982 |
| JP | 1-202583 A | 8/1989 |

OTHER PUBLICATIONS

German-language Written Opinion (PCT/ISA/237) issued in PCT Application No. PCT/EP2015/064382 dated Sep. 1, 2015 (six pages).

German Office Action issued in counterpart German Application No. 10 2014 213 460.9 dated Feb. 19, 2015 (seven pages).

English translation of Chinese Office Action issued in counterpart Chinese Application No. 201580037237.X dated Jul. 3, 2018 (eight pages).

\* cited by examiner

FLAP ASSEMBLY FOR A MOTOR VEHICLE

CROSS REFERENCE TO RELATED APPLICATIONS

This application is a continuation of PCT International Application No. PCT/EP2015/064382, filed Jun. 25, 2015, which claims priority under 35 U.S.C. § 119 from German Patent Application No. 10 2014 213 460.9, filed Jul. 10, 2014, the entire disclosures of which are herein expressly incorporated by reference.

BACKGROUND AND SUMMARY OF THE INVENTION

The present invention relates to a flap assembly for a motor vehicle, with a body flap, in particular a front flap, which closes an assembly space of the motor vehicle and is pivotable between a closed state and an open state.

It is known to provide a front end of a passenger motor vehicle with a front flap or engine hood which closes an engine compartment which is located in the front end. A rear end of the front flap is customarily arranged adjacent, with a predetermined distance, to a windshield. Rainwater, for example, can drain from the windshield into a gap between the front flap and the windshield and is collected there via a "cowl covering", which may also be referred to as a water tank covering or assembly space covering. The water is then conducted away from at least one lowest point of the cowl covering. A cowl covering of this type is customarily a plastics injection molding component and has walls at suitable locations in order to collect the draining rainwater and to conduct the same away to the lowest point of the cowl covering.

Furthermore, a known motor vehicle of this type has an interior compartment ventilation device or interior compartment air conditioning device which is arranged adjacent to a vehicle interior compartment and sucks up fresh air in the region of the cowl covering. However, a sucking up action in the region of the cowl covering is problematic in so far as relatively large contaminants, such as, for example, foliage, may collect in the region of the cowl covering and, as a result, may also enter into a region of the air intake of the air conditioning device. This damages the interior compartment air conditioning device.

It is therefore the object of the present invention to provide a flap assembly for a motor vehicle, in which entry of contaminants into the assembly (equipment) space is suppressed or is at least reduced.

This and other objects are achieved by a flap assembly for a motor vehicle according to the invention. The flap assembly has a front flap which closes an assembly space of the motor vehicle and is pivotable between a closed state and an open state. The front flap has a flap wall which, in the closed state of the front flap, extends substantially in a vertical direction of the vehicle. Furthermore, the assembly space has an assembly space wall, wherein the flap wall and the assembly space wall are formed opposite each other in the closed state of the front flap, and therefore a sealing action is produced in order to prevent entry of contaminants, in particular of foliage and the like, into the assembly space.

Opposite each other means that the flap wall and the assembly space wall overlap in the closed state of the front flap and are arranged here, for example, substantially parallel to each other. The sealing action is achieved here in the manner of a labyrinth, wherein it is prevented in particular that solid contaminants pass through the labyrinth formed from the flap wall and the assembly space wall. The flap wall and the assembly space wall can also be arranged at an angle or obliquely to each other. In particular, the flap wall and the assembly space wall can be arranged in such a manner that, in the closed state of the flap, a distance between the flap wall and the assembly space wall is reduced or increased in the vertical direction of the vehicle. Furthermore, the flap wall and the assembly space wall may alternatively or additionally also be arranged in such a manner that, in the closed state of the flap, a distance between the flap wall and the assembly space wall is reduced or increased in a direction parallel to the flap. In all of these cases, the flap wall and the assembly space wall should be arranged opposite each other at least still to the extent that a labyrinth function is maintained.

The assembly space may be a space in which one or more assemblies (equipment) of the motor vehicle, such as, for example, an engine, a pump, an interior compartment air conditioning device, electrical and electronic components and systems, etc. can be located.

According to a preferred development of the present invention, a water collecting region is formed in a region below a rear end of the front flap and adjacent to a windshield of the motor vehicle, wherein the assembly space wall is part of the water collecting region.

A water collecting region serves in particular to collect water which drains from the windshield, and then to conduct said water away from the water collecting region via suitable water outlets without the water disadvantageously being able to enter the assembly space located below and/or next to the water collecting region. The water collecting region is preferably formed by a "cowl covering", which may also be called an assembly space covering or water tank covering. The assembly space wall, as part of the water collecting region, forms a dam or a barrier here which prevents the water from running at an undesirable location into the assembly space and not draining through the predetermined water outlet.

In the case of the flap assembly according to the present invention, the flap wall and the assembly space wall can preferably be arranged in an air intake region of an assembly, in particular of an interior compartment ventilation device, such as, for example, an interior compartment air conditioning device, wherein air can be sucked up through a gap between the flap and the assembly space or an opening in the front flap.

For an interior compartment ventilation device, it is necessary for sufficiently clean air to be sucked up, wherein this is frequently the case in the abovementioned water collecting region. For this purpose, a sufficient air through opening has to be present between the closed flap and an outer side, wherein this air can then be supplied to the interior compartment ventilation device or can be sucked up there by the interior compartment ventilation device via the labyrinth like region between assembly space wall and flap wall.

If the flap wall and the assembly space wall are located in an air intake region, the flap wall is preferably arranged upstream of the assembly space wall in the air intake direction in the closed state of the front flap.

According to a further development, the flap wall is arranged in a seal free region of the front flap.

Accordingly, the flap wall and the opposite assembly space wall do not form a completely fluidtight, in particular gastight, arrangement in the closed state of the front flap. For example, an elastic rubber seal is not arranged between the front flap and a body side element in this region. This is advantageous to the extent that air can thereby be supplied from the outside to within the flap wall or to within the assembly space.

The flap wall preferably has through holes which are arranged in particular in the manner of a grid. Depending on anticipated contaminations by way of foliage and the like, the grid or the through holes can be arranged in such a manner that they permit a passage of air but can substantially retain foliage and other relatively large solids. The through holes can be provided in a number and size suitable for this purpose. For example, the through holes can be slots which are arranged next to one another and, in the closed state of the front flap, extend substantially in a vertical direction of the vehicle.

Additionally or alternatively, through holes can also be formed in the assembly space wall, which through holes can likewise be designed in such a manner that a passage of air is possible, but anticipated large contaminants, such as, for example, foliage, are retained.

In the closed state of the flap, a distance of 1 to 50 mm is preferably formed between the flap wall and the assembly space wall. In particular, a distance of 3 to 20 mm is advantageously formed. Particularly preferably, a distance of 5 to 15 mm is formed.

Furthermore, an overlap in the vertical direction of the vehicle between the flap wall and the assembly space wall may be, for example, 5 to 100 mm, wherein a particularly preferred and effective range is 20 to 50 mm.

These dimensions, i.e. the overlap and spacing of the flap wall and the assembly space wall, permit firstly a sufficient labyrinth function, as already described above, of the flap wall and the assembly space wall with a simultaneous passage of air and, secondly, nevertheless sufficient manufacturing tolerances of the front flap, the flap wall, the assembly space wall and further components of the motor vehicle as well as sufficient clearances for adjusting a position of the front flap via flap hinges.

The flap wall is preferably attached releasably to an inner side of the front flap. By this means, the flap wall is interchangeable and can be designed to be structurally highly flexible and can optionally be realized in particularly lightweight form.

Alternatively, however, the flap wall may also be an integral part of the front flap, wherein the front flap can be composed, for example, of a fiber reinforced plastic or a metallic material, such as, for example, aluminum or steel.

The flap wall, in particular in the case in which it is attached releasably to an inner side of the front flap, is preferably a plastics injection molded part.

Additionally or alternatively, the assembly space wall can be a plastics injection molded part.

In the case in which the assembly space wall is part of a water collecting region, the assembly space wall can be formed integrally together with the water collecting region as a plastics injection molded part.

The flap wall preferably extends substantially in a transverse direction of the vehicle and/or in a longitudinal direction of the vehicle. However the flap wall may also run transversely and be suitably curved.

According to a preferred development, the flap wall and the assembly space wall are arranged in the region of a flap hinge of the front flap. The flap hinge can be fastened here, in particular, laterally to a body support. A gap is produced here between the assembly space wall or the flap wall and the body support, via which gap air can be supplied to, for example, the interior space ventilation device.

The flap wall is preferably designed as a foliage catching fence.

The above developments of the invention may be combined as desired with one another to the extent expedient and possible.

Other objects, advantages and novel features of the present invention will become apparent from the following detailed description of one or more preferred embodiments when considered in conjunction with the accompanying drawings.

DETAILED DESCRIPTION OF THE DRAWINGS

A description of the exemplary embodiments of the present invention with reference to the figures follows.

Figure 1:
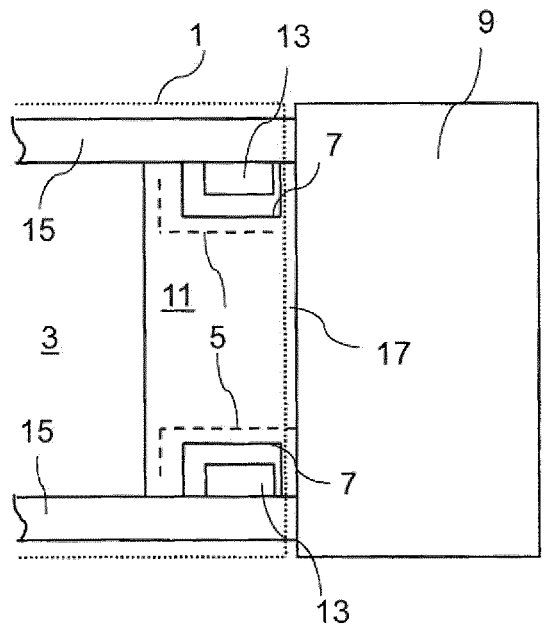
FIG. 1 is a schematic top view of a flap assembly according to a first exemplary embodiment of the present invention.
Figure 2:
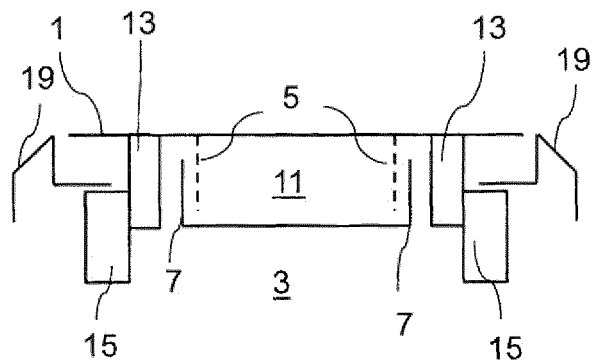
FIG. 2 is a schematic sectional view in the vehicle transverse direction of the flap assembly according to the first exemplary embodiment of the present invention.

FIG. 1 and FIG. 2 show a first exemplary embodiment, wherein the flap assembly according to the first exemplary embodiment has a front flap 1 which covers an assembly space 3. A rear region of the front flap 1, which region is adjacent to a windshield 9, is shown in this connection in FIG. 1. In FIG. 1, the outlines of the front flap 1 are indicated with a dotted line, whereas the front flap 1 in FIG. 2 is shown with a solid line. A water collecting device with a water collecting region 11 which can collect water draining from the windshield 9 and can conduct said water away in a specific manner via water outlets is located below the rear end of the front flap 1 and a front end of the windshield 9. The water collecting region 11 has assembly space walls 7 which extend substantially in the vertical direction of the vehicle, as can be seen from the sectional view taken along a y-z plane of the motor vehicle in FIG. 2. In the present case, the assembly space walls 7 extend around the region of a left and right flap hinge 13, which flap hinges are fastened to the inner side of a left and right wheel house support 15. The front flap 1 is openable and closable via the flap hinges 13.

Furthermore, the front flap 1 has flap walls 5 which are fastened releasably to the front flap 1 and are illustrated in FIGS. 1 and 2 with a dashed line. The flap walls 5 are formed by plastic injection molding and have through holes which are arranged in the manner of a grid. The through holes are formed parallel to one another and are in the form of slots extending in the vertical direction of the vehicle. In the closed state of the front flap 1, as is shown in the figures, the flap walls 5 and the assembly space walls 7 lie opposite one another substantially parallel and therefore form a labyrinth-like barrier between the water collecting region 11 and the assembly space 3. The flap walls 5 are arranged in the air intake direction in front of the respective associated opposite assembly space walls 7.

The assembly space 3 contains, inter alia, an interior compartment ventilation device or air conditioning device which sucks up fresh air via a gap 17 between a rear end of the front flap 1 and the windshield or the water collecting region 11, the water collecting region 11 and the labyrinth-like gap between the flap walls 5 and the assembly space walls 7 and also the through holes.

By means of water flowing off from the windshield or by means of air circulation, relatively large contaminants in the form of solids, such as, for example, foliage or the like, can pass into the water collecting region 11. However, the labyrinth-like barrier which is formed by the flap wall 5 and the assembly space wall 7 prevents the large contaminants, such as, for example, the foliage, from being sucked further into the assembly space 3, as a result of which an air intake region of the interior compartment ventilation device is protected.

FIG. 2 also schematically indicates a left and a right mudguard 19 which are attached to the left and right wheel house supports.

Figure 3:
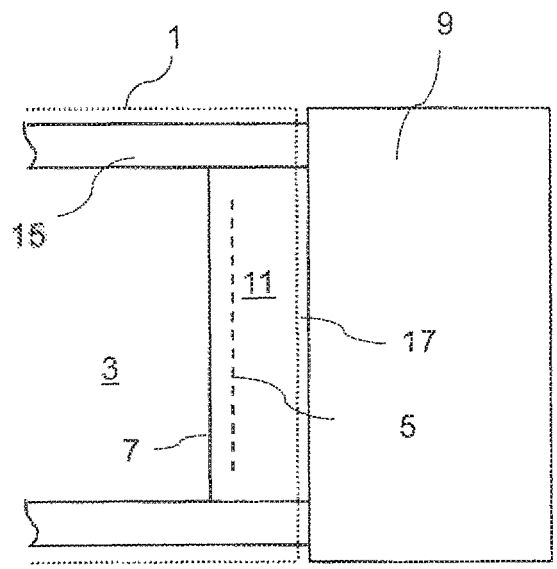
FIG. 3 is a schematic top view of a flap assembly according to a second exemplary embodiment of the present invention.
Figure 4:
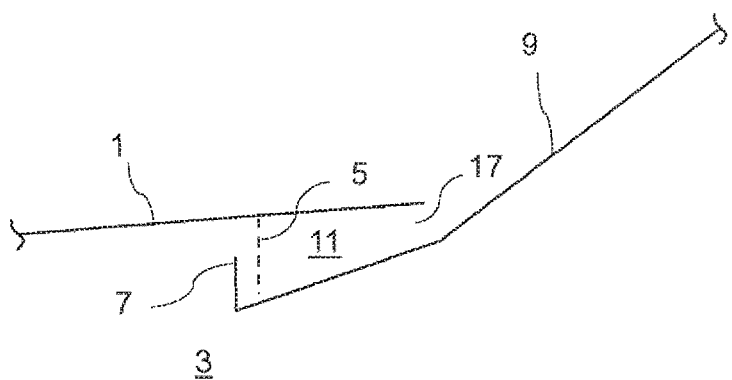
FIG. 4 is a schematic sectional view in the vehicle longitudinal direction of the flap assembly according to the second exemplary embodiment of the present invention.

A second exemplary embodiment of the present invention is described below with reference to FIGS. 3 and 4, wherein in particular differences from the first exemplary embodiment are indicated and common features may be omitted in order to avoid repetition.

According to the second exemplary embodiment, a flap arrangement has a front flap 1 which covers and closes an assembly space 3. A water collecting device with a water collecting region 11 is located below an end region of the front flap 1, adjacent to a windshield 9. The water collecting device separates the assembly space 3 from the water collecting region 11. The water collecting device has an assembly space wall 7 which extends substantially in the transverse and vertical directions of the vehicle and forms a barrier to water draining from the windshield 9.

A flap wall 5, which is composed of a plastics injection molded part, is fastened releasably to the front flap 1. As in the first exemplary embodiment, the flap wall 5 of the second exemplary embodiment has through holes, for example in the form of slots which are arranged in parallel and extend in the vertical direction of the vehicle, for the passage of air. A gap 17 which extends over an entire width of the front flap 1 is formed between a rear end of the front flap 1 and the water collecting device or the windshield 9.

An interior compartment ventilation device (not shown in the figures) or interior compartment air conditioning device with an air intake region is arranged below the water collecting region 11 in the assembly space 3. The interior compartment ventilation device sucks up air via the gap 17 and the labyrinth-like barrier which is formed by the flap wall 5 and the assembly space wall 7.

As in the first exemplary embodiment, the flap wall 5 and the assembly space wall 7 are formed parallel to, and overlap with, each other. The two walls 5, 7 according to the second exemplary embodiment extend substantially in a transverse direction of the vehicle.

In the event of large, solid-like contaminants, such as, for example, foliage, entering the water collecting region 11, an interaction of the flap wall 5 and of the assembly space wall 7 can reliably prevent contaminants of this type from entering the assembly space 3. At the same time, a sufficient passage of air, in particular through the through holes in the flap wall 5, is ensured.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A flap assembly for a motor vehicle having an assembly space, comprising:
   a front flap pivotable between a closed state and an open state to close and open the assembly space of the motor vehicle, the front flap having a flap wall which, in the closed state of the front flap, extends substantially in a vertical direction of the motor vehicle;
   an assembly space wall of the assembly space, wherein
   the flap wall and the assembly space wall are arranged opposite one another forming a labyrinth passage in the closed state of the front flap, and
   the flap wall and the assembly space wall provide a sealing action in order to prevent entry of contaminants into the assembly space through the labyrinth.

2. The flap assembly according to claim 1, further comprising:
   a water collecting device provided in a region below a rear end of the front flap and adjacent to a window of the motor vehicle, wherein
   the assembly space wall forms a portion of the water collecting device.

3. The flap assembly according to claim 2, wherein
   the flap wall and the assembly space wall are arranged in an air intake region of an assembly, and
   a gap formed between the front flap and the assembly space or an opening in the front flap allows for air to be sucked up through the gap or the opening.

4. The flap assembly according to claim 3, wherein the assembly is an interior compartment ventilation device.

5. The flap assembly according to claim 1, wherein
   the flap wall and the assembly space wall are arranged in an air intake region of an interior compartment ventilation device, and
   a gap formed between the front flap and the assembly space or an opening in the front flap allows for air to be sucked up through the gap or the opening.

6. The flap assembly according to claim 1, wherein the flap wall is arranged in a seal-free region of the front flap.

7. The flap assembly according to claim 1, wherein one or both of the flap wall and the assembly space wall has through holes arranged in a grid.

8. The flap assembly according to claim 5, wherein one or both of the flap wall and the assembly space wall has through holes arranged in a grid.

9. The flap assembly according to claim 1, wherein a distance between the flap wall and the assembly space wall in the closed state of the front flap is between 1 to 50 mm.

10. The flap assembly according to claim 1, wherein a distance between the flap wall and the assembly space wall in the closed state of the front flap is between 3 to 20 mm.

11. The flap assembly according to claim 1, wherein a distance between the flap wall and the assembly space wall in the closed state of the front flap is between 5 to 15 mm.

12. The flap assembly according to claim 1, wherein the flap wall and the assembly space wall overlap one another in a vertical direction of the motor vehicle by 5 to 100 mm.

13. The flap assembly according to claim 1, wherein the flap wall and the assembly space wall overlap one another in a vertical direction of the motor vehicle by 20 to 50 mm.

14. The flap assembly according to claim 9, wherein the flap wall and the assembly space wall overlap one another in a vertical direction of the motor vehicle by 5 to 100 mm.

15. The flap assembly according to claim 1, wherein the flap wall is attached releasably to an inner side of the front flap.

16. The flap assembly according to claim 1, wherein the flap wall is an integral part of the front flap.

17. The flap assembly according to claim 1, wherein one or both of the flap wall and the assembly space wall is a plastic injection molded part.

18. The flap assembly according to claim 1, wherein the flap wall extends substantially in one or both of a transverse direction and a longitudinal direction of the motor vehicle.

19. The flap assembly according to claim 1, wherein the flap wall and the assembly space wall are arranged in a region of a flap hinge of the front flap, said flap hinge being fastened laterally to a body support of the motor vehicle.

20. The flap assembly according to claim 19, wherein the flap hinge is fastened in a manner facing the assembly space of the motor vehicle.

\* \* \* \* \*